United States Patent [19]
Hoogland

[11] Patent Number: 5,841,578
[45] Date of Patent: *Nov. 24, 1998

[54] INTEGRATED OPTICAL SYSTEM FOR ENDOSCOPES AND THE LIKE

[76] Inventor: Jan Hoogland, 8982 N. Applegate Rd., Grants Pass, Oreg. 97527

[*] Notice: The term of this patent shall not extend beyond the expiration date of Pat. No. 5,633,754.

[21] Appl. No.: 687,910

[22] Filed: Jul. 30, 1996

Related U.S. Application Data

[63] Continuation of Ser. No. 351,481, Dec. 6, 1994, Pat. No. 5,633,754.

[51] Int. Cl.$^6$ .................................................. G02B 23/00
[52] U.S. Cl. ......................... 359/434; 359/435; 359/362
[58] Field of Search .................................... 359/362, 367, 359/422, 432, 434–435, 738–740, 644, 664

[56] References Cited

U.S. PATENT DOCUMENTS

| | | | |
|---|---|---|---|
| 2,519,760 | 8/1950 | Hett | 359/367 |
| 4,140,364 | 2/1979 | Yamashita et al. | 359/367 |
| 4,285,578 | 8/1981 | Yamashita | 359/644 |
| 4,300,812 | 11/1981 | Nakahashi | 359/432 |
| 4,354,734 | 10/1982 | Nakahashi | 359/664 |
| 4,545,652 | 10/1985 | Hoogland | 359/435 |
| 4,575,195 | 3/1986 | Hoogland | 359/435 |
| 4,598,980 | 7/1986 | Doi | 359/735 |
| 4,730,909 | 3/1988 | Takahashi | 359/735 |
| 4,755,029 | 7/1988 | Okabe | 359/654 |
| 4,784,118 | 11/1988 | Fantone et al. | 600/160 |
| 4,822,154 | 4/1989 | Oxford et al. | 359/367 |
| 4,984,878 | 1/1991 | Miyano | 359/783 |
| 4,993,817 | 2/1991 | Hoogland | 359/708 |
| 5,005,960 | 4/1991 | Heimbeck | 359/435 |
| 5,059,009 | 10/1991 | McKinley | 359/435 |
| 5,257,133 | 10/1993 | Chen | 359/434 |
| 5,327,283 | 7/1994 | Zobel | 359/434 |
| 5,341,240 | 8/1994 | Broome | 359/435 |
| 5,359,453 | 10/1994 | Ning | 359/435 |
| 5,412,504 | 5/1995 | Leiner et al. | 359/435 |
| 5,416,634 | 5/1995 | Ning | 359/434 |
| 5,444,569 | 8/1995 | Broome | 359/434 |
| 5,625,488 | 4/1997 | Dietzsch et al. | 359/435 |
| 5,633,754 | 5/1997 | Hoogland | 359/434 |

FOREIGN PATENT DOCUMENTS

| | | | |
|---|---|---|---|
| 558 278 A1 | 9/1993 | European Pat. Off. | |
| 0301015 | 12/1988 | Japan | 385/117 |
| 2 267 762 | 12/1993 | United Kingdom | |
| WO 92/19008 | 10/1992 | WIPO | |

OTHER PUBLICATIONS

"The primary aberration characteristics. . . . of relay systems." S.J. Dobson and J. Ribiero Meas. Sci. Technol. 5 (1994) pp. 32–36.

Nintendo surgery.
M. Thomas Optics and Phot. News Jul. 1994 pp. 6–7.

*Primary Examiner*—Thong Nguyen
*Attorney, Agent, or Firm*—Knobbe, Martens, Olson & Bear, LLP

[57] ABSTRACT

Optical systems for endoscopes, borescopes, dental scopes, and the like which are characterized by having three groups of lenses of positive optical power and an external entrance pupil. Typically, all three groups of lenses are displaced from the pupil and focal planes. As a consequence, the displaced groups take part in the image transfer as well as in the pupil transfer. The optical power requirements can thus be shifted from one group to another, distributing as well as reducing the overall power requirement. Moreover, the aberration correction can also be shared between these groups. The first group, which conventionally has the highest optical power, and consequently a large amount of aberrations to be corrected, can in this way transfer some of the optical aberration correction to the other groups. The sharing of the optical functions and aberration correction results in a fully integrated optical system. The reduction in the total amount of optical power is so large that a line-of-sight deviating prism can be readily accommodated between the entrance pupil and the first lens group. The resulting simplicity of the optical system makes it suitable as a disposable item.

9 Claims, 3 Drawing Sheets

INTEGRATED OPTICAL SYSTEM FOR ENDOSCOPES AND THE LIKE

This is a continuation application of U.S. patent application Ser. No. 08/351,481, filed Dec. 6, 1994, which issued as U.S. Pat. No. 5,633,754.

FIELD OF THE INVENTION

The present invention relates generally to optical lens systems, and more particularly to lens systems suitable for endoscopes and the like.

BACKGROUND OF THE INVENTION

In endoscopy and related fields, such as borescopes and dental scopes, the complete optical system is thought of as consisting of four basic and separate optical functions. Those functions are, in sequence of the direction of the travelling light, as follows:

(1) an objective which forms the first image of an object under surveillance, (2) a field lens which images the pupil of the objective onto the next image transfer lens, (3) an image transfer lens which reimages the first image onto the next field lens. The pupil and image transfer steps are repeated as often as is needed to obtain a desired tube length, and (4) a focussing lens which presents the final image to a sensor, like a person's eye, a CCD camera, or a photographic film.

This approach is the classical approach, and it is appropriate for the following reasons:

(1) The design of the optical system is broken up into parts with single and clearly defined and separate functions, functions to each of which an optical designer may bring considerable experience.

(2) The light transfer capacity and information transfer capacity of an endoscope is at a maximum when the optical power is concentrated at the image planes and pupil planes. The expedience of this approach is brought out by numerous U.S. patents on endoscopes which consistently treat the objective, the relay system, and the eyepiece as separate parts of the total system.

The disadvantage of treating the different optical components as separate entities is that the distribution of the optical power is very uneven and that certain aberrations are naturally at a maximum, like astigmatism, field curvature, and chromatic aberrations. The correction of these aberrations require relatively short radii of curvature. These short radii of curvature are difficult to fabricate, require tight tolerances, and they are therefore the main contributors to the considerable cost of the fabrication of an endoscope. A truly inexpensive endoscope, sufficiently inexpensive to be offered as a disposable item, is presently not practical with conventional designs.

SUMMARY OF THE INVENTION

The present invention provides an integrated optical system suitable for endoscopes, borescopes, dental scopes, and the like, which contains a minimum of elements, the elements having relatively long radii of curvature and not necessarily of a meniscus shape. The outside entrance pupil location is very suitable for a tapered probe or for concealment, or to accommodate a line-of-sight deviating prism, and is a natural consequence of the arrangement of the optical groups. The system lends itself to mass production and is highly insensitive to tilt and decentration of its components. As a consequence, it is eminently suitable as a disposable item.

Broadly, the foregoing advantages are achieved in a lens system characterized by an integrated design which has an external entrance pupil and in which the majority of the groups are displaced from the image planes and pupil planes. In this way most components share in the pupil transfer as well as in the image transfer. Moreover, the aberration correction is distributed in an advantageous way over all the groups, providing relief to the first group which conventionally is in need of most of the aberration correction. It has been found that this integration of the optical functions and aberration correction is very beneficial in that it greatly simplifies the optical system.

A plano-convex lens or even a double convex lens, when used according to the invention, can be corrected for astigmatism since it is displaced from the stop location. In this way, no optical surfaces of very short radii of curvature are needed to correct the astigmatism of the total optical system. Furthermore, the spherical aberration of a convex-plano lens used in the present invention is very near the minimum possible for a single element. Also, the chromatic aberration is greatly reduced by the displacement of the elements from the image planes and pupil planes as a comparison with the classical arrangement will readily show. A factor two to four in the reduction of the chromatic aberration is thus achieved without the presence of a chromatic aberration reducing element, sometimes making further color correction unnecessary. Even a system incorporating several transfers is fully color corrected by the use of a single color correcting element. The distortion, which is usually very high in the objective, is corrected at more convenient and effective places. The result is a single integrated system which replaces the three conventional separate parts, i.e., the objective, the field lens, and a relay lens. This single integrated system may be augmented, as is well known in the art of optical design, the additional optics, like a close-up lens, a field expander, a field flattening lens, or with additional relay groups, without falling outside the scope of the invention.

DETAILED DESCRIPTION OF THE PREFERRED EMBODIMENT

The illustrative embodiments to be described below are standardized to a length of about 100 millimeters of the basic optical system and mostly for a nominal magnification of unity. In this way, the performance of the various examples can be conveniently compared. Embodiments with other magnifications, fields of view, numerical apertures, and with additional relays are presented in order to show that the general concept of the invention is effective over a wide range of applications. The embodiments use conventional, non-GRIN (gradient refractive index) lens elements, and thus each lens has a uniform refractive index. In FIGS. 1–11, the object and image planes are indicated by at 'Obj' and 'Im,' respectively, and the focal planes of the objectives and the pupil planes by an 'F' and a 'P', respectively. The optical system features of object plane, pupil plane, lens surfaces and final image plane are numbered sequentially. Tables I–XI present the construction parameters of the preferred embodiments illustrated in corresponding FIGS. 1–11. All dimensions are in millimeters. The first column indicates the surface number shown in the figures, the second column indicates the radius of curvature of the surface, and the third column indicates the axial separations. The refractive indices and dispersion are presented in the usual manner, with respect to the e, F', and C' spectral lines. The aspheric data are presented in the standard manner. The surface and plane numbers refer to those in the figures. Table I refers to the system shown in FIG. 1, Table II to the system of FIG. 2, and so on for the other tables and figures.

Figure 1:
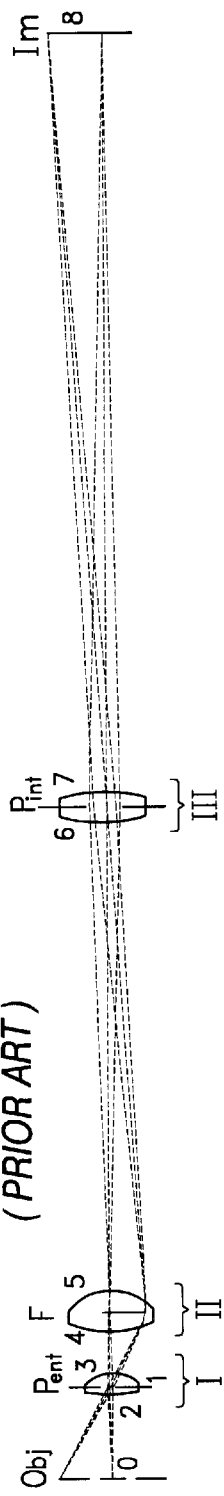
FIG. 1 is an optical schematic view of an endoscope constructed in accordance with a conventional layout in which each component has a single function in the system.

FIG. 1 is an optical schematic of an endoscope which is constructed in accordance with the classical concept of separation of the various functions. Group I is an objective which contains the entrance pupil plane ($P_{ent}$) while group II represents a field lens which is located at the focal plane of the objective (F). Group III represents a transfer lens which transfers the image formed by the objective onto a subsequent focal pane (here, the image plane, Im). All groups are located at pupil planes or focal planes. It is apparent from the drawing as well as from the data of Table XII that the distribution of optical power is very uneven. The value of the sum of the absolute values of the curvatures, which is a measure of difficulty of fabrication, is listed in Table XII for this version, which is uncorrected for chromatic aberrations. A version corrected for chromatic aberration would have more than doubled the value for the sum of the curvatures. The pertinent performance data are listed in Table XII, and the construction parameters are listed in Table I.

Figure 2:
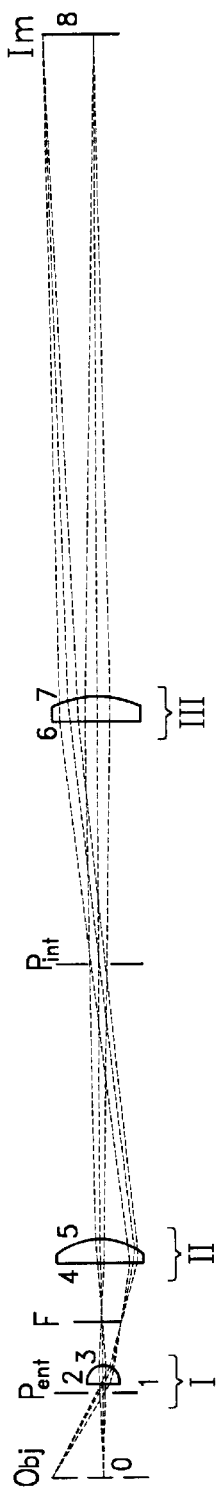
FIG. 2 is an optical schematic view of a first preferred embodiment of the invention in which the entrance pupil is located outside the first group by a relatively small distance.

FIG. 2 is an optical schematic of an endoscope of extreme simplicity. Only three plastic elements having a nonmeniscus shape and devoid of steep curves are needed to provide diffraction limited performance for the monochromatic aberrations. Many applications do not require a line-of-sight deviating prism, and in such cases, a pencil-shaped tip, which is often an advantageous configuration, can be readily provided. The pertinent performance data are listed in Table XII, and the construction parameters are listed in Table II.

Figure 3:
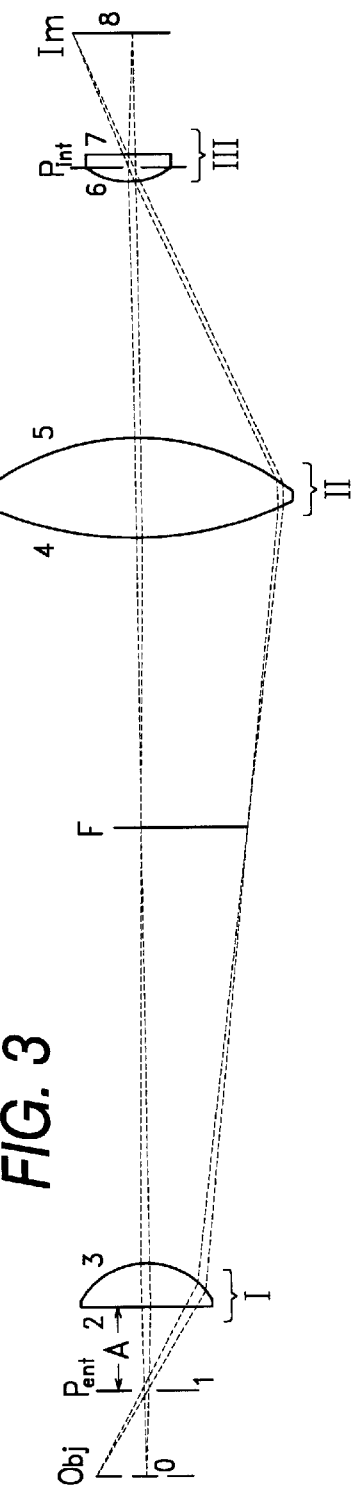
FIG. 3 is an optical schematic view of a second preferred embodiment in which full advantage of the power reduction and aberration reduction is taken by locating the entrance pupil outside the first group by a large distance.

FIG. 3 is an optical schematic of an endoscope which is also extremely simple in construction but is nevertheless highly corrected for all aberrations, including chromatic aberrations. Although no negative element has been added to correct chromatic aberration, the chromatic aberration is more than a factor four smaller than in the classical layout (c.f. FIG. 1) and is within the diffraction limit. This example clearly shows the advantage which a redistribution of power, with the attendant shift of pupil ($P_{int}$) location, brings. This somewhat extreme case is achieved at the cost of larger optical components.

Figure 4:
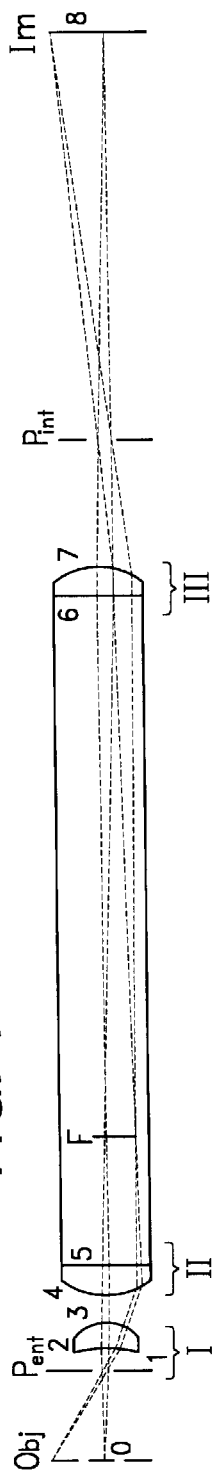
FIG. 4 is an optical schematic view of a third preferred embodiment which incorporates a rod-shaped element.

FIG. 4 is an optical schematic of an endoscope which consists of only two components. The second and third groups are cemented to a rod-shaped element, so that there are only four glass/air surfaces. Despite its simplicity, all aberrations are at the diffraction limit. This example shows that rod-shaped elements can be profitably employed in the present invention. It also shows that rod-shaped elements may alter the location of the intermediate pupil plane ($P_{int}$) and focal plane of the objective (F), which have now moved beyond the third and second groups, respectively. A shorter rod-shaped element can put the intermediate focal and pupil planes (F and $P_{int}$) at the second (II) or third (III) element if so desired. The exemplary embodiments do not require meniscus-shaped optical elements. This does not, of course, preclude their use, as is shown in this example. The gain in using meniscus shapes, however, is modest.

Figure 5:
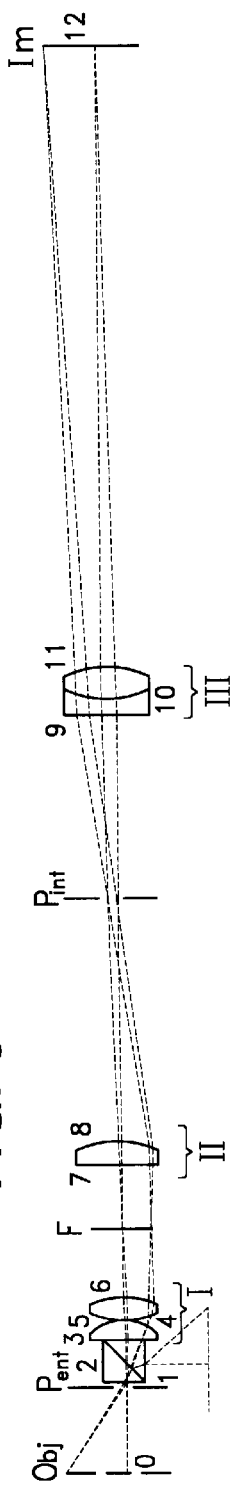
FIG. 5 is an optical schematic view of a fourth preferred embodiment of all glass elements which incorporates a single negative element which provides chromatic aberration correction for the whole system.

FIG. 5 is an optical schematic of an endoscope which is constructed entirely of glass elements, none of which are meniscus shaped. All curvatures are shallow and spherical. The first group easily provides the needed space for a line-of-sight deviation prism between the entrance pupil $P_{ent}$ and the first group (I), even though the field of view is relatively large (seventy degrees). It is important to note that, despite the fact that the first group (I) is not color corrected in any way, the chromatic aberration of the whole system is fully corrected by means of a single negative element. All three groups (I, II, III) are far removed from the objective focal plane (F) and the intermediate pupil plane ($P_{int}$), showing the full integration of the three groups. The pertinent performance data are listed in Table XII and the construction parameters in Table V.

Figure 6:
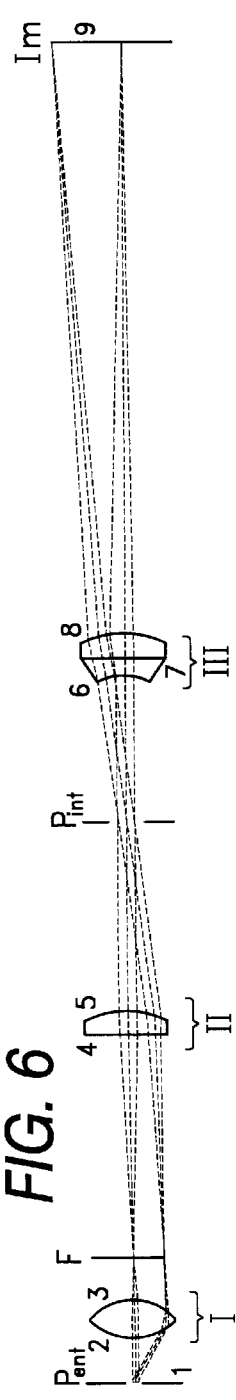
FIG. 6 is an optical schematic view of a fifth preferred embodiment of a simple glass and plastic system with full correction of chromatic aberration.

FIG. 6 is an optical schematic of an endoscope which is constructed partly of glass and partly of plastic. Again, no steep curves or meniscus elements are needed to achieve the relatively high numerical aperture (N.A.) of 0.025. The distortion is well corrected. The object distance has been set at infinite distance to show that the basic design is not affected by a change in magnification as is generally the case with endoscopes. The pertinent performance data are listed in Table XII, and the construction parameters are listed in Table VI.

Figure 7:
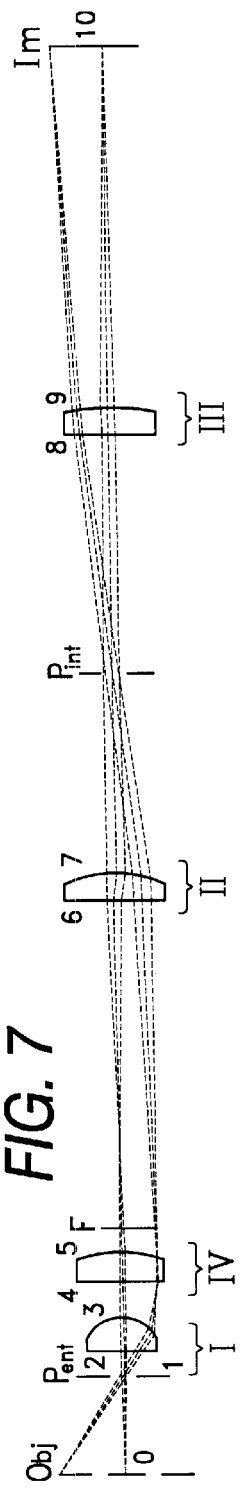
FIG. 7 is an optical schematic view of a sixth preferred embodiment in which the three basic groups have been augmented with an element near the focal plane of the first group.

FIG. 7 is an endoscope to which an additional group of optical power (IV) has been added, resulting in a modestly improved monochromatic performance. The added element IV is positioned close to the image plane of the objective (F) where it is most effective. Its relatively weak, in this case positive, power shows that most of the burden of the optical functions as well as the aberration correction is carried by the groups which are displaced from the image planes and pupil planes. This example shows that an additional element near an image plane or a pupil plane can be used. The pertinent performance data are listed in Table VII.

Figure 8:
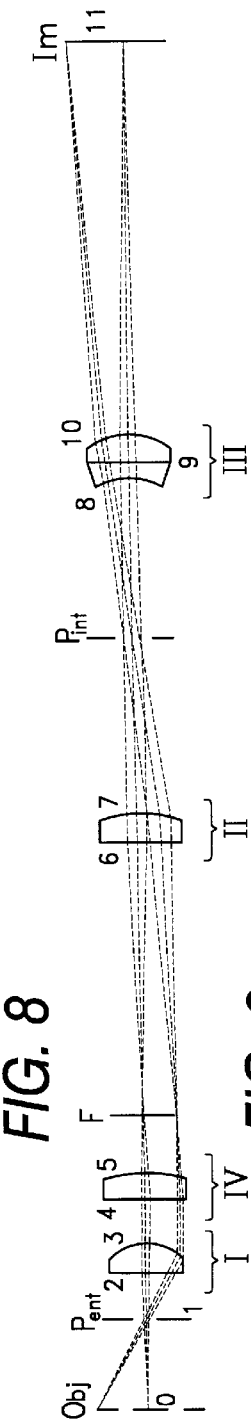
FIG. 8 is an optical schematic view of a seventh preferred embodiment in which a fourth group (IV) of low optical power has been added near the focal plane of the first group (F), the fourth group containing a single negative element for correcting the chromatic aberrations.

FIG. 8 is a highly corrected endoscope using plastic elements with a relatively high N.A. of 0.025. Only one of the elements, the second element, is preferably positioned close to an image or pupil plane but is again of low optical power. The pertinent performance data are listed in Table XII, and the construction parameters are listed in Table VIII.

Figure 9:
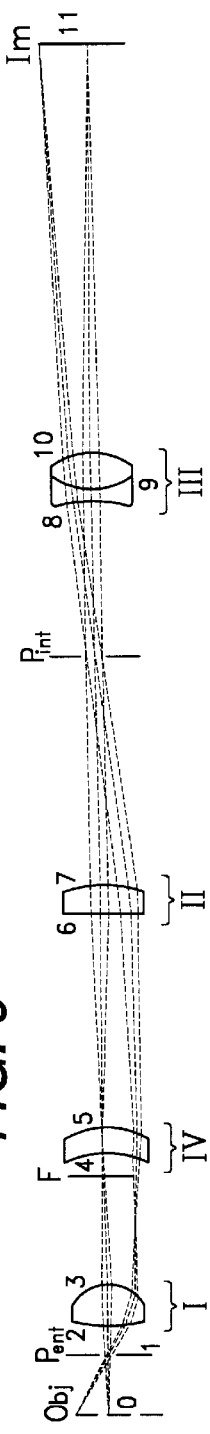
FIG. 9 is an optical schematic view of an eighth preferred embodiment which incorporates a meniscus shaped element.

FIG. 9 is an endoscope similar to the one shown in FIG. 8. The magnification has been increased to 2×, showing that the design remains very similar to the 1× and 0× designs, as is generally the case with endoscopes. Again a meniscus element has been employed to show that despite the fact that the present invention can be very well executed with non-meniscus elements, their employment is by no means excluded. In this case the fourth group (IV, the meniscus element) is of negative power, again showing that the fourth element is a nonessential addition to the other three groups of the invention. The pertinent performance data are listed in Table XII, and the construction parameters are listed in Table IX.

Figure 10:
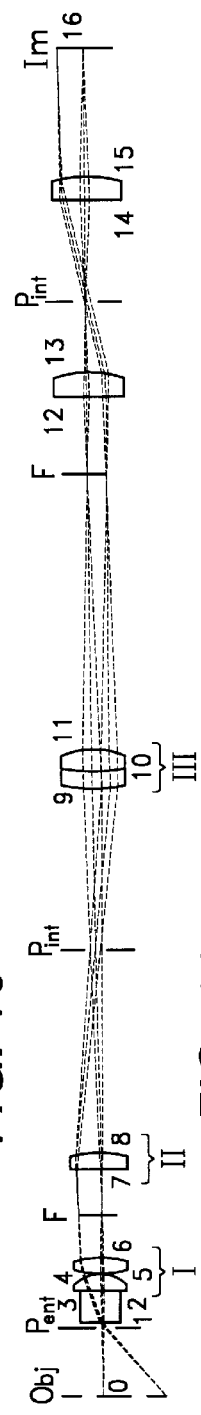
FIG. 10 is an optical schematic view of a ninth preferred embodiment which incorporates a second image relay and is fully corrected for chromatic aberrations with a single element of negative optical power.

FIG. 10 is an endoscope in which a second relay (IV) is used. It has a very large field of view of eighty degrees and a relatively high N.A. of 0.025. Despite these large values, a deviation prism can be readily accommodated between the objective (I) and the entrance pupil ($P_{ent}$). The total system is still very well corrected and needs only a single color correcting element of low power in order to provide full correction of the chromatic aberrations. As the first three groups (I, II, III) are fully correctable by themselves, the addition of classical relays to those first three groups is not excluded. The pertinent performance data are listed in Table XII, and the construction parameters are listed in Table X.

Figure 11:
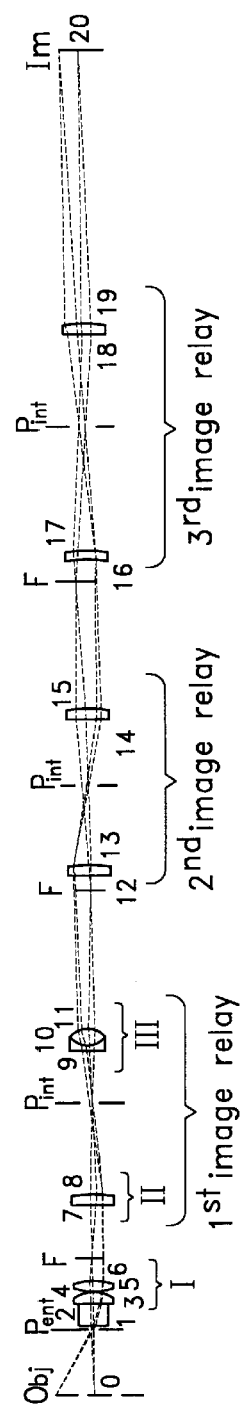
FIG. 11 is an optical schematic view of a tenth preferred embodiment which incorporates a third image relay and is still fully corrected for chromatic aberrations using only one element of negative optical power.

FIG. 11 shows an endoscope with three image relays and is still very well corrected. Again, the chromatic aberrations are filly corrected with a single element of negative optical power. In this case the optical power of the color correcting element approaches a value comparable to those of the other components. All elements are of glass, and no aspheric surfaces are employed. The pertinent performance data are listed in Table XII, and the construction parameters are listed in Table XI.

It is thus evident from these embodiments that three groups (an objective, a field lens, and a relay lens) can be integrated to yield an endoscope, thereby greatly reducing the overall optical power requirement. The reduction in the overall optical power reduces the amount of aberrations to be corrected which considerably simplifies the optical system. An additional, and in many cases a very valuable, feature of the invention is that the optimal location of the entrance pupil is outside the system.

In Tables I–XII, the following abbreviations are used.

"CC" stands for "Conic constant," and is equal to "k" in Equation 1;

"AD" represents the aspheric constant "d" in Equation 1; and

"AE" represents the aspheric constant "e," in Equation 1.

$$z = \frac{c\rho^2}{\left[1 + \sqrt{1 - (k+1)c^2\rho^2}\right]} + d\rho^4 + e\rho^6 + f\rho^8 + g\rho^{10} \quad (1)$$

Equation 1 is the well-known formula for describing an aspheric surface, in which z is in the direction of the optical axis, $\rho$ is the distance from the optical axis, and c is the surface curvature (1/RD). The aspheric constants f and g in the present embodiments are equal to zero.

TABLE I

| SURF | RD | TH | INDEX | υ-VALUE | CC |
|---|---|---|---|---|---|
| 0 | | 6.51 | OBJECT PLANE | | |
| 1 | | −0.51 | ENTRANCE PUPIL PLANE | | |
| 2 | 2.60 | 1.40 | 1.4938 | 57.0 | −52.0 |
| 3 | −1.60 | 3.00 | AIR | | −7.5 |
| 4 | 4.00 | 3.00 | 1.4938 | 57.0 | −12.0 |
| 5 | −3.80 | 33.00 | AIR | | |
| 6 | 18.00 | 2.00 | 1.4938 | 57.0 | |
| 7 | −24.76 | 51.64 | AIR | | |
| 8 | | | IMAGE PLANE | | |
| EFL= | −5.518 | 0.020 N.A. | 60 DEG F.O.V. | MAGN = 1.000 | |

TABLE II

| SURF | RD | TH | INDEX | υ-VALUE | CC |
|---|---|---|---|---|---|
| 0 | | 6.00 | OBJECT PLANE | | |
| 1 | | 0.60 | ENTRANCE PUPIL PLANE | | |
| 2 | 00 | 1.2 | 1.4938 | 57.0 | |
| 3 | −1.10 | 7.4 | AIR | | −0.40 |
| 4 | 00 | 1.5 | 1.7762 | 49.3 | |
| 5 | −6.30 | 36.80 | AIR | | |
| 6 | 00 | 1.50 | 1.4938 | 57.3 | |
| 7 | −11.81 | 44.85 | AIR | | −3.00 |
| 8 | | | IMAGE PLANE | | |
| EFL= | −5.543 | 0.020 N.A. | 60 DEG F.O.V. | MAGN = 1.000 | |

TABLE III

| SURF | RD | TH | INDEX | υ-VALUE | CC |
|---|---|---|---|---|---|
| 0 | | 6.00 | OBJECT PLANE | | |
| 1 | | 6.00 | ENTRANCE PUPIL PLANE | | |
| 2 | 00 | 3.00 | 1.4938 | 57.0 | |
| 3 | −4.7 | 51.30 | AIR | | −0.65 |
| 4 | 25.70 | 7.00 | 1.4938 | 57.0 | |
| 5 | −11.70 | 18.00 | AIR | | −2.90 |
| 6 | 7.00 | 2.00 | 1.4938 | 57.0 | |
| 7 | −13.48 | 6.72 | AIR | | −560.00 |
| 8 | | | OUTPUT FOCAL PLANE | | |
| EFL= | −3.216 | 0.020 NA | 60 DEG F.O.V. | MAGN = 1.000 | |

TABLE IV

| SURF | RD | TH | INDEX | υ-VALUE | CC |
|---|---|---|---|---|---|
| 0 | | 6.00 | OBJECT PLANE | | |
| 1 | | 2.00 | ENTRANCE PUPIL PLANE | | |
| 2 | −5.00 | 1.80 | 1.4938 | 57.0 | |
| 3 | −2.10 | 1.70 | AIR | | −0.056 |
| 4 | 5.83 | 2.00 | 1.6203 | 63.1 | |
| 5 | 00 | 48.00 | 1.8126 | 25.2 | |
| 6 | 00 | 2.00 | 1.4938 | 57.0 | |
| 7 | −7.01 | 36.50 | AIR | | −1.30 |
| 8 | | | IMAGE PLANE | | |
| EFL= | −4.846 | 0.020 N.A. | 60 DEG F.O.V. | MAGN = 1.000 | |

TABLE V

| SURF | RD | TH | INDEX | υ-VALUE | CC |
|---|---|---|---|---|---|
| 0 | | 6.00 | OBJECT PLANE | | |
| 1 | | −0.20 | ENTRANCE PUPIL PLANE | | |
| 2 | 00 | 3.00 | 1.7162 | 53.2 | |
| 3 | 00 | 1.50 | 1.7762 | 49.3 | |

TABLE V-continued

| SURF | RD | TH | INDEX | υ-VALUE | CC |
|---|---|---|---|---|---|
| 4 | −4.0 | 0.20 | AIR | | |
| 5 | 13.50 | 1.50 | 1.7762 | 49.3 | |
| 6 | −13.50 | 9.50 | AIR | | |
| 7 | 00 | 1.50 | 1.7762 | 49.3 | |
| 8 | −10.9 | 30.80 | AIR | | |
| 9 | 00 | 1.20 | 1.8097 | 30.2 | |
| 10 | 8.80 | 2.00 | 1.5914 | 61.0 | |
| 11 | −8.47 | 42.55 | AIR | | |
| 12 | | | IMAGE PLANE | | |
| EFL= | −5.495 | 0.017 N.A. | 70 DEG F.O.V. | MAGN = 1.000 | |

TABLE VI

| SURF | RD | TH | INDEX | υ-VALUE | CC |
|---|---|---|---|---|---|
| 0 | INFINITY | | OBJECT PLANE | | |
| 1 | | 3.2 | ENTRANCE PUPIL PLANE | | |
| 2 | 4.90 | 2.5 | 1.4938 | 57.0 | −1.50 |
| 3 | −2.90 | 18.60 | AIR | | −2.50 |
| 4 | 00 | 2.00 | 1.4938 | 57.0 | |
| 5 | −8.80 | 24.00 | AIR | | −0.70 |
| 6 | −7.00 | 1.20 | 1.5901 | 29.6 | 1.40 |
| 7 | 00 | 2.00 | 1.6543 | 58.3 | |
| 8 | −6.55 | 40.51 | AIR | | |
| 9 | | | IMAGE PLANE | | |
| EFL= | −7.794 | 0.025 N.A. | 60 DEG F.O.V. | MAGN = .000 | |

TABLE VII

| SURF | RD | TH | INDEX | υ-VALUE | CC |
|---|---|---|---|---|---|
| 0 | | 6.00 | OBJECT PLANE | | |
| 1 | | 1.90 | ENTRANCE PUPIL PLANE | | |
| 2 | 00 | 2.50 | 1.4938 | 57.0 | |
| 3 | −2.00 | 2.70 | AIR | | −0.66 |
| 4 | 00 | 2.00 | 1.4938 | 57.0 | |
| 5 | −16.80 | 25.00 | AIR | | 32.00 |
| 6 | 00 | 2.00 | 1.4938 | 57.0 | |
| 7 | −9.60 | 31.20 | AIR | | −1.20 |
| 8 | 00 | 2.00 | 1.4938 | 57.0 | |
| 9 | −17.85 | 24.68 | AIR | | −28.00 |
| 10 | | | image plane | | |
| EFL= | −5.301 | 0.020 NA | 70 DEG F.O.V. | MAGN = 1.000 | |

TABLE VIII

| SURF | RD | TH | INDEX | υ-VALUE | CC |
|---|---|---|---|---|---|
| 0 | | 6.00 | OBJECT PLANE | | |
| 1 | | 3.20 | ENTRANCE PUPIL PLANE | | |
| 2 | 00 | 2.50 | 1.4938 | 57.0 | |
| 3 | −2.50 | 3.00 | AIR | | −0.64 |
| 4 | 00 | 2.00 | 1.4938 | 57.0 | |
| 5 | −26.00 | 24.70 | AIR | | 57.00 |
| 6 | 00 | 2.00 | 1.4938 | 57.0 | |
| 7 | −9.20 | 25.00 | AIR | | −1.00 |
| 8 | −4.30 | 1.20 | 1.5901 | 29.6 | −0.30 |
| 9 | 00 | 2.00 | 1.4938 | 57.0 | |
| 10 | −3.61 | 28.35 | AIR | | −0.70 |
| 11 | | | IMAGE PLANE | | |
| EFL= | −5.599 | 0.025 N.A. | 60 DEG F.O.V. | MAGN = 1.000 | |

TABLE IX

| SURF | RD | TH | INDEX | υ-VALUE | CC |
|---|---|---|---|---|---|
| 0 | | 3.00 | OBJECT PLANE | | |
| 1 | | 2.40 | ENTRANCE PUPIL PLANE | | |
| 2 | 12.40 | 3.00 | 1.4938 | 57.0 | |
| 3 | −2.32 | 9.70 | AIR | | −0.80 |
| 4 | −7.60 | 2.00 | 1.4938 | 57.0 | |
| 5 | −8.10 | 15.90 | AIR | | 2.80 |
| 6 | 00 | 2.00 | 1.4938 | 57.0 | |
| 7 | −10.00 | 28.50 | AIR | | −1.20 |
| 8 | −24.00 | 1.20 | 1.5901 | 29.6 | 70.00 |
| 9 | 5.00 | 2.50 | 1.4938 | 57.0 | |
| 10 | −6.36 | 29.82 | AIR | | |
| 11 | | | IMAGE PLANE | | |
| EFL= | −4.891 | 0.025 N.A. | 60 DEG F.O.V. | MAGN = 2.000 | |

TABLE X

| SURF | RD | TH | INDEX | υ-VALUE | AD | AE |
|---|---|---|---|---|---|---|
| 0 | | 8.00 | OBJECT PLANE | | | |
| 1 | | 0.10 | ENTRANCE PUPIL PLANE | | | |
| 2 | 00 | 3.80 | 1.8126 | 25.2 | | |
| 3 | 00 | 1.80 | 1.7762 | 49.3 | | |
| 4 | −4.30 | 0.20 | AIR | | | |
| 5 | 11.40 | 1.50 | 1.7762 | 49.3 | | |
| 6 | −17.00 | 10.00 | AIR | | | |
| 7 | 00 | 2.00 | 1.7762 | 49.3 | | |
| 8 | −18.90 | 40.30 | AIR | | | |
| 9 | 13.00 | 2.00 | 1.8550 | 23.6 | | |
| 10 | 8.50 | 2.50 | 1.4985 | 81.2 | | |
| 11 | −19.30 | 39.80 | AIR | | | |
| 12 | 00 | 2.00 | 1.7762 | 49.3 | | |
| 13 | −8.34 | 20.00 | AIR | | | |
| 14 | 00 | 2.00 | 1.7044 | 29.8 | | |
| 15 | −8.83 | 14.04 | AIR | | 9.0E − 4 | 112.0E−5 |
| 16 | | | IMAGE PLANE | | | |
| EFL= | 3.792 | 0.025 N.A. | 80 DEG F.O.V. | MAGN = −.500 | | |

TABLE XI

| SURF | RD | TH | INDEX | υ-VALUE | CC |
|---|---|---|---|---|---|
| 0 | | 12.00 | OBJECT PLANE | | |
| 1 | | 0.10 | ENTRANCE PUPIL PLANE | | |
| 2 | 00 | 4.50 | 1.8126 | 25.2 | |
| 3 | 00 | 2.00 | 1.7762 | 49.3 | |
| 4 | −4.30 | 0.20 | AIR | | |
| 5 | 38.00 | 1.50 | 1.7762 | 49.3 | |
| 6 | −14.00 | 15.00 | AIR | | |
| 7 | 00 | 1.60 | 1.7792 | 49.3 | |
| 8 | −14.00 | 27.00 | AIR | | |
| 9 | 50.00 | 1.20 | 1.8550 | 23.6 | |
| 10 | 4.50 | 3.00 | 1.4985 | 81.2 | |
| 11 | −4.70 | 28.80 | AIR | | |
| 12 | 00 | 2.00 | 1.7762 | 49.3 | |
| 13 | −11.00 | 26.70 | AIR | | |
| 14 | 00 | 2.00 | 1.7662 | 49.3 | |
| 15 | −9.90 | 27.30 | AIR | | |
| 16 | −14.70 | 2.00 | 1.7662 | 49.3 | |
| 17 | −8.00 | 40.70 | AIR | | |
| 18 | 00 | 2.00 | 1.7662 | 49.3 | |
| 19 | −20.33 | 50.40 | AIR | | |
| 20 | | | IMAGE PLANE | | |
| EFL= | −5.737 | 0.017 N.A. | 60 DEG F.O.V. | MAGN = .500 | |

TABLE XII

| 1 Fig | 2 N.A. | 3 FOV | 4 M | 5 EPD | 6 El. | 7 Relay | 8 sC | 9 Dist | 10 Ptz | 11 WavFr | 12 AxCir |
|---|---|---|---|---|---|---|---|---|---|---|---|
| 1 | 0.020 | 60 | 1.0 | −0.5 | 3 | 1 | 1.62 | −2 | 0.54 | 0.79 | 0.90 |
| 2 | 0.020 | 60 | 1.0 | 0.6 | 3 | 1 | 1.15 | −2 | 0.40 | 0.32 | 0.80 |
| 3 | 0.020 | 60 | 1.0 | 6 | 3 | 1 | 0.55 | −1 | 0.18 | 0.10 | 0.21 |
| 4 | 0.020 | 60 | 1.0 | 2 | 3 | 1 | 0.99 | +2 | 0.20 | 0.27 | 0.31 |
| 5 | 0.015 | 70 | 1.0 | 0.2 | 5 | 1 | 0.84 | −16 | 0.25 | 0.31 | 0.12 |
| 6 | 0.025 | 60 | 0.0 | 3.2 | 4 | 1 | 0.96 | −3 | 0.23 | 0.46 | 0.14 |
| 7 | 0.020 | 70 | 1.0 | 1.9 | 4 | 1 | 0.72 | −6 | 0.24 | 0.27 | 0.63 |
| 8 | 0.025 | 60 | 1.0 | 3.2 | 5 | 1 | 1.06 | −1 | 0.19 | 0.21 | 0.31 |
| 9 | 0.025 | 60 | 2.0 | 2.4 | 5 | 1 | 1.47 | +0 | 0.23 | 0.15 | 0.03 |
| 10 | 0.025 | 80 | −0.5 | 0.1 | 7 | 2 | 1.03 | −2 | 0.33 | 0.31 | 0.35 |
| 11 | 0.017 | 60 | 0.5 | 0.1 | 9 | 3 | 1.51 | −11 | 0.36 | 0.48 | 0.04 |

Column 1 Figure number.
Column 2 Numerical aperture at the output focal plane.
Column 3 Total field of view at the object side, in degrees.
Column 4 Magnification.
Column 5 Entrance pupil distance (air equivalent value), in mm.
Column 6 Number of elements with optical power.
Column 7 Number of image relays.
Column 8 Sun of the absolute values of all curvatures (i.e., the sum of the absolute values of the reciprocals of the radii of curvature), in units of 1/mm.
Column 9 Maximum image distortion in percent.
Column 10 Petzvalsum of the total system, in units of 1/mm.
Column 11 Monochromatic peak to valley wavefront deformation over the whole field and unvignetted aperture at the e spectral line.
Column 12 Axial chromatic aberration in waves with respect to the e, C', and F 'spectral lines.

Having thus described the invention I claim:

1. An endoscopic imaging system, including an optical system having an optical axis, said optical system comprising an objective and a relay system of elements, said relay system forming an image, each of said elements having an input surface and an output surface wherein at least one of said surfaces has a non-zero curvature, said elements chosen and arranged such that the sum of absolute values of all non-zero surface curvatures results in a value less than approximately 1.5/mm when the length of said optical system is standardized to 100 mm.

2. The endoscopic imaging system of claim 1, said image formed by said relay having an axial color aberration of less than about 0.8 waves.

3. The endoscopic imaging system of claim 1, said image formed by said relay having an axial color aberration of less than about 0.35 waves.

4. The endoscopic imaging system of claim 1, said image formed by said relay having an axial color aberration of less than about 0.21 waves.

5. The endoscopic imaging system of claim 1, further comprising one negative element which provides color correction for the entire optical system.

6. The endoscopic imaging system of claim 1, further comprising a prism located on the object-side of said objective and not included in said length of said optical system.

7. The endoscopic imaging system of claim 1, further comprising a field expander located on the object-side of said objective and not included in said length of said optical system.

8. The endoscopic imaging system of claim 1, further comprising an additional relay system following said optical system.

9. The endoscopic imaging system of claim 1, wherein the relationship between said sum of absolute values of all surface curvatures and said optical system length is such that said sum times said length is less than about 151.

* * * * *